United States Patent [19]
Ovanin

[11] 3,858,893
[45] Jan. 7, 1975

[54] SELF-CENTERING AND COMPENSATING CHUCK

[75] Inventor: George J. Ovanin, Euclid, Ohio

[73] Assignee: The S-P Manufacturing Corporation, Solon, Ohio

[22] Filed: June 19, 1973

[21] Appl. No.: 371,367

Related U.S. Application Data

[63] Continuation of Ser. No. 234,538, March 14, 1972, abandoned.

[52] U.S. Cl. .................... 279/17, 279/1 J, 279/119
[51] Int. Cl. ............................................. B23b 31/16
[58] Field of Search .......... 279/119, 120, 121, 106, 279/108, 110, 1 J, 1 L, 17

[56] References Cited
UNITED STATES PATENTS
2,794,648   6/1957   Sampson ............................. 279/1 J
3,178,192   4/1965   Sampson ........................ 279/119 X

*Primary Examiner*—Gil Weidenfeld
*Attorney, Agent, or Firm*—Watts, Hoffmann, Fisher & Heinke Co.

[57] ABSTRACT

A lever-operated jaw chuck adaptable for compensating and centering actions through minor modification, and hence useful for bar work, chucking work and shaft work. A central axial passageway extends through the chuck for receiving either a work-locating center or a guide for a jaw-lever actuator. The jaw-lever actuator is an annular cam within the chuck that surrounds, is carried by, and moves axially with a reciprocable tubular operator. A circumferential gap between the operator and actuator permits transverse floating movement of the actuator and hence, a compensating chuck action. The gap is unobstructed in a forward direction, toward the face of the chuck, to receive the removable guide. Placement of the guide within the gap between the operator and actuator prevents transverse floating movement of the actuator without regard to the angular position or circumferential location of the guide within the gap. The actuator guide is constructed to permit a workpiece to pass through the central passageway of the chuck.

12 Claims, 5 Drawing Figures

PATENTED JAN 7 1975 3,858,893
SHEET 1 OF 3
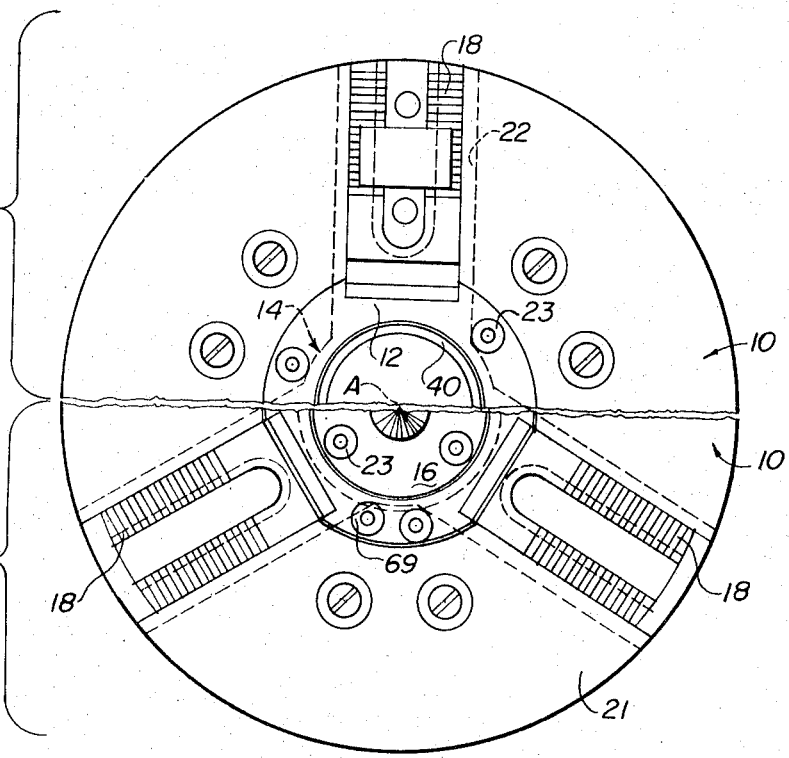
FIG. IA
FIG. IB
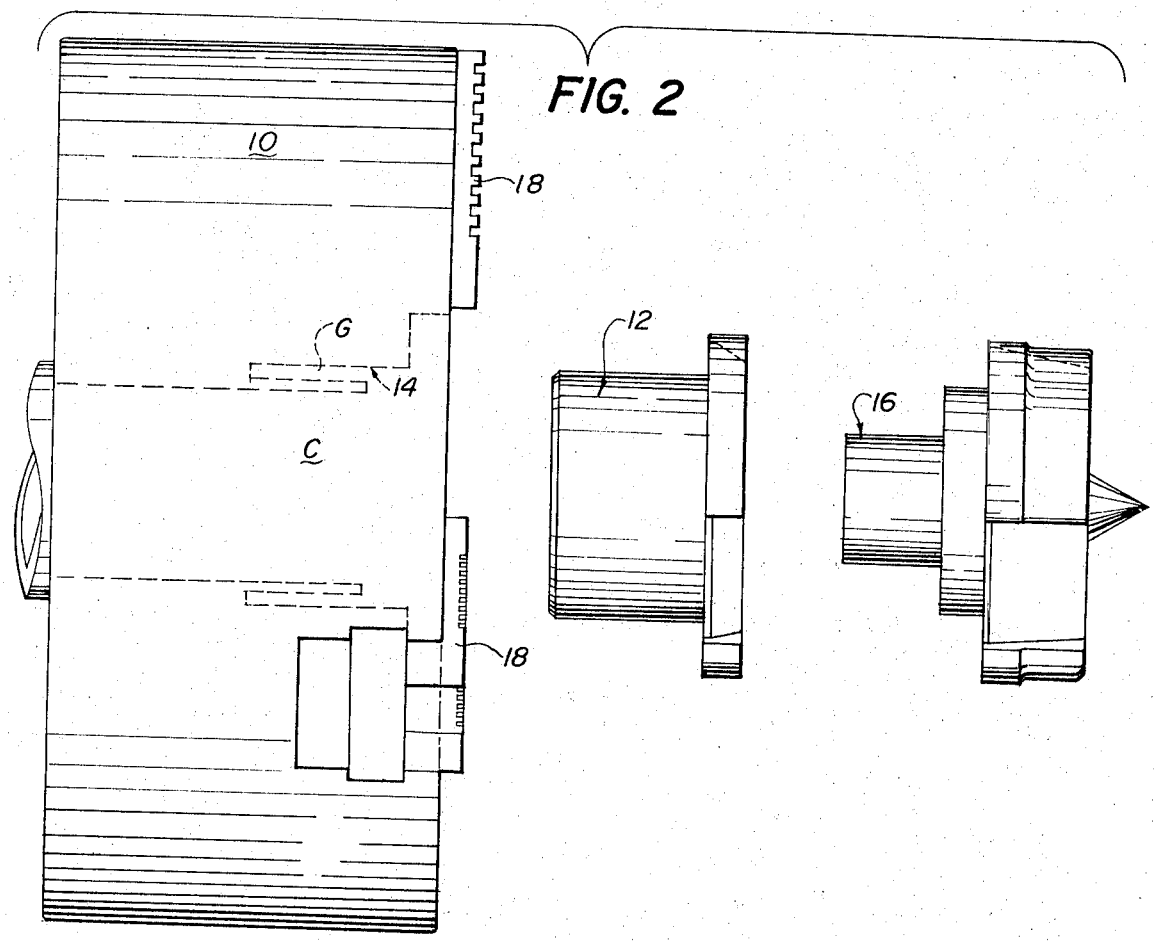
FIG. 2

SELF-CENTERING AND COMPENSATING CHUCK

This is a continuation, of application Ser. No. 234,538, filed Mar. 14, 1972 now abandoned.

BACKGROUND OF THE INVENTION

This invention relates to a chuck for gripping workpieces that is readily adaptable to both centering and compensating actions.

Centering chucks or universal chucks are used to grip workpieces on machined surfaces and are constructed so that all jaws of the chuck move equal distances toward and away from the chuck center. This establishes a workpiece center axis based on the gripped machined surface and the jaws themselves "center" the work. Compensating chucks find use in machine tools where a workpiece is to be gripped on a non-machined surface. The central axis of such a workpiece is established by centers that engage the ends of the workpiece and define an axis of rotation, one center being carried by the compensating chuck. The workpiece is rotated through the gripping action of the jaws of the chuck, which is rotated by a machine tool spindle. The jaws of the compensating chuck are constructed to compensate for the surface out-of-roundness through an operating linkage that applies equal pressure to the jaws while moving them unequal distances from the axis of the chuck.

Compensating chucks with adjustable means for limiting or eliminating the compensating action are known and typically utilize an internal adjustment in the relationship of parts integral with the chuck and operating linkage to eliminate a rocking or floating movement of a jaw operating member. Such chucks by and large have required the interengagement of an adjustable part and a jaw-actuating part, resulting in the inclusion of additional parts, imposing limitations on the construction of the chuck operating mechanism and increasing the complexity and cost of the chuck. In addition, the operating mechanisms and the adjustable parts of chucks of this general type have occupied the central area of the chuck bodies, thereby preventing the option of utilizing the chuck for bar work that passes through the center of the chuck, when the chuck is operated with a centering action.

SUMMARY OF THE INVENTION

In accordance with the present invention, a chuck is provided with a jaw-operating mechanism having a compensating action that can be eliminated by an insertable guide that will prevent compensation and cause all jaws to move equally in response to actuation. Both the guide and a conventional center, which is used when the jaws are allowed to compensate, are interchangeable, only one being carried by the chuck at a time. Thus, the guide need not be compatible with the chuck operation when a compensating action is desired and the present arrangement eliminates any need for adjustment of parts or adjustable interaction of parts, to change internal relationships of the chuck when the differnt actions are desired.

The chuck utilizes a centrally located lever-operating cam that rocks levers connected to the chuck jaws to move the jaws toward and away from a work-gripping position. The cam is carried by a reciprocable operator connectable to a reciprocable draw tube by a collar, and is secured to the operator for positive axial movement, but will float transversely. When the guide is utilized, a portion is received between the cam and the supporting cam operator to prevent floating movement of the cam relative to the operator and thereby eliminate the compensating action of the jaws.

One important and advantageous feature of this invention is that the cam-supporting operator, and the cam, as well as the draw tube connecting collar of the chuck, are all of annular or tubular construction to permit work to pass through the center of the chuck. Another advantageous feature is that the guide is constructed to cooperate with and prevent transverse movement of the cam in any angular position, so that its orientation is not critical. In addition, the guide is constructed to function in the nature of a dust bushing and in use is positioned in overlapping relationship with the tubular cam-supporting operator of the chuck, providing a full seal between the inside mechanism of the chuck and the central passageway that permits work to pass through the chuck. By virtue of the tubular construction of the operating mechanism and the guide, the chuck will handle bar work, i.e., long lengths, by permitting the work to pass through the center of the chuck, and also chucking work, i.e., cast or forged workpieces having an external machined surface, with the guide in place to establish the desired centering action. It will also handle shaft work on centers, with a center being substituted for the dust bushing guide, the compensating action of the jaws being automatically restored upon removal of the guide. By virtue of the above construction, the chuck is also collet adaptable when both the dust bushing guide and the work-locating center are removed.

Both the facility to receive and support the different types of workpieces as well as an automatic change in the jaw action are accomplished by the mere exchange of a dust bushing guide and a center, one for the other, in the central passageway of the chuck. This exchange is facilitated by a unique construction and relationship of the jaw actuating cam and the cam-supporting operator, which provides a forwardly opening and unobstructed annular gap between the lever-actuating cam and the cam supporting operator. When a portion of the removable dust bushing guide extends inwardly from the front face of the chuck and is received within the annular gap, transverse floating movement of the cam is positively prevented, so that the chuck jaws move equally in response to axial movement of the cam.

From the above, it will be apparent that an object of the present invention is to provide a chuck with a compensating jaw action, that can receive a center to locate a workpiece when the jaws are operated with a compensating action, and that can be converted to operate the jaws with a centering action by the substitution of a dust bushing guide for the center.

Another object of this invention is to provide a chuck of the type referred to above, in which the body of the chuck is constructed to allow a workpiece to pass through the chuck along the central axis thereof, when the chuck is converted to provide a centering action.

Other objects, features and advantages of this invention will become more apparent from the following detailed description, when considered in connection with the accompanying drawings.

BRIEF DESCRIPTION OF THE DRAWINGS

FIGS. 1A and 1B together show a front elevational view of a chuck embodying the present invention, diagrammatically divided horizontally, FIG. 1A illustrating the upper half of the chuck with a central dust bushing guide for establishing a centering action of the jaws, and FIG. 1B illustrating the lower half of the chuck with a center for locating a workpiece when the jaws have a compensating action;

FIG. 2 is a side elevational view of the chuck shown in FIGS. 1A and 1B, illustrating the dust bushing guide and center both removed therefrom, diagrammatically indicating their interchangeability.

DETAILED DESCRIPTION OF A PREFERRED EMBODIMENT

Figure 3:
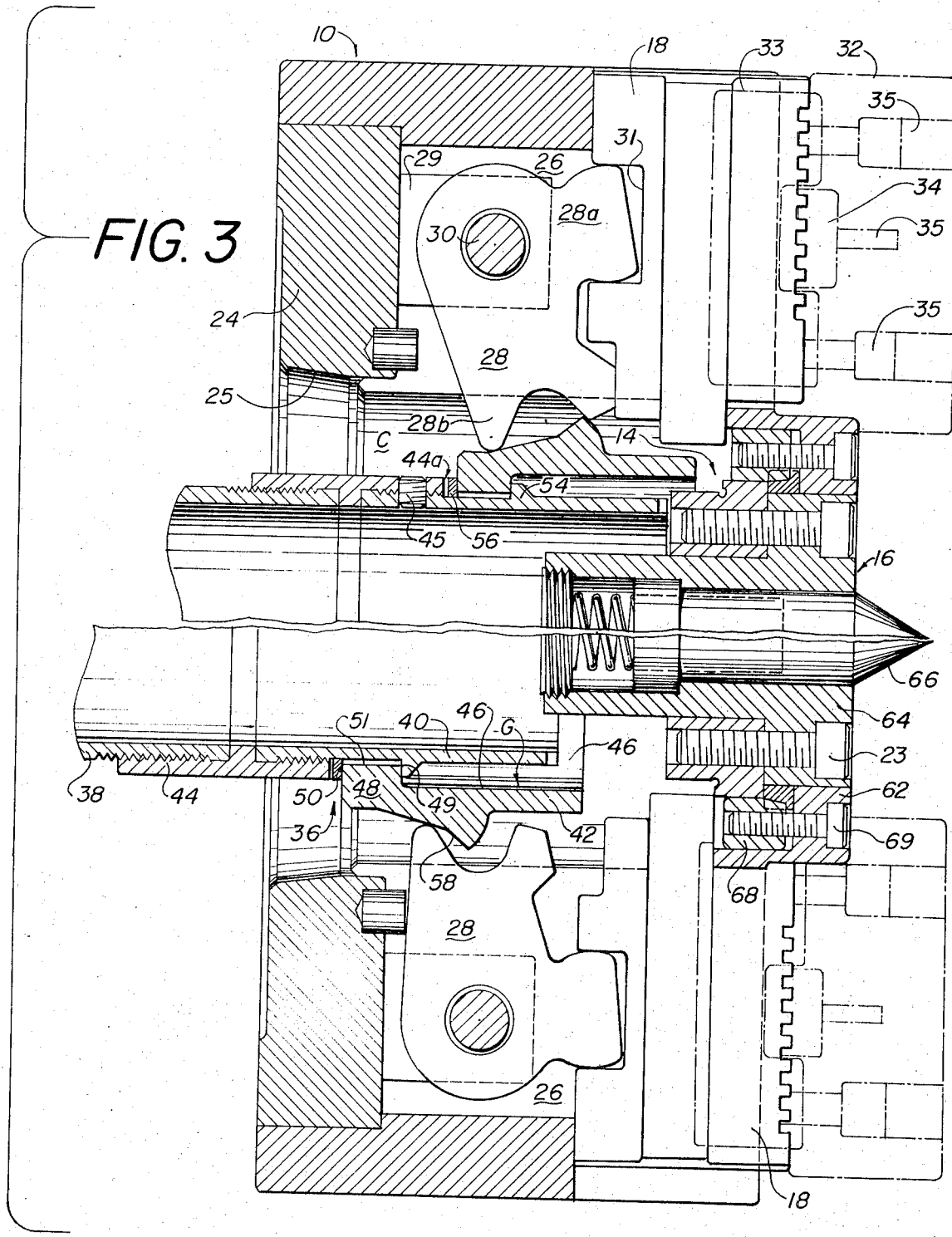
FIG. 3 is a cross sectional view of the chuck shown in FIG. 1B with a center for locating a workpiece, showing the compensating action, and diagrammatically indicating in the upper half of the figure the condition of the chuck with the jaws opened, and in the lower half with the jaws closed; and, FIG. 4 is a cross sectional view of the chuck of FIG. 1A containing the dust bushing guide that prevents compensating action of the chuck jaws, with the upper half of the drawing illustrating the chuck with the jaws opened and the lower half with the jaws closed.

FIGS. 1A and 1B illustrate upper and lower halves of a chuck body 10 that has a central aperture 14. The upper half of the body is shown with a dust bushing guide 12 in a central aperture 14. Except for the dust bushing guide and work center, which are interchangeable, the upper and lower chuck body halves are representative of the same body.

The chuck body 10 is cylindrical and has three master jaws extending radially from a central axis A of the chuck body and displaced equiangularly about the axis, in a front face 21 of the chuck. As will be explained in more detail subsequently, the jaws 18 are movable radially in ways 22, toward and away from the central axis A. The movement for all jaws is uniform when the dust bushing guide 12 is in place, but may be non-uniform or unequal when the center 16 is used, to compensate for eccentricity of the external surface of a workpiece.

As diagrammatically shown in dotted line in FIG. 2, the chuck body 10 has a central cavity C formed by the central aperture 14, in which either the dust bushing guide 12 or the work center 16 is received, depending upon whether the chuck is to be used as a universal, i.e., self-centering, chuck for gripping bar stock or workpieces having machined external surface, or as a compensating chuck, for workpieces with unmachined external surfaces, located by a center. The dust bushing guide 12 and the work center 16 are secured in the cavity C with suitable machine screws 23.

Figure 4:
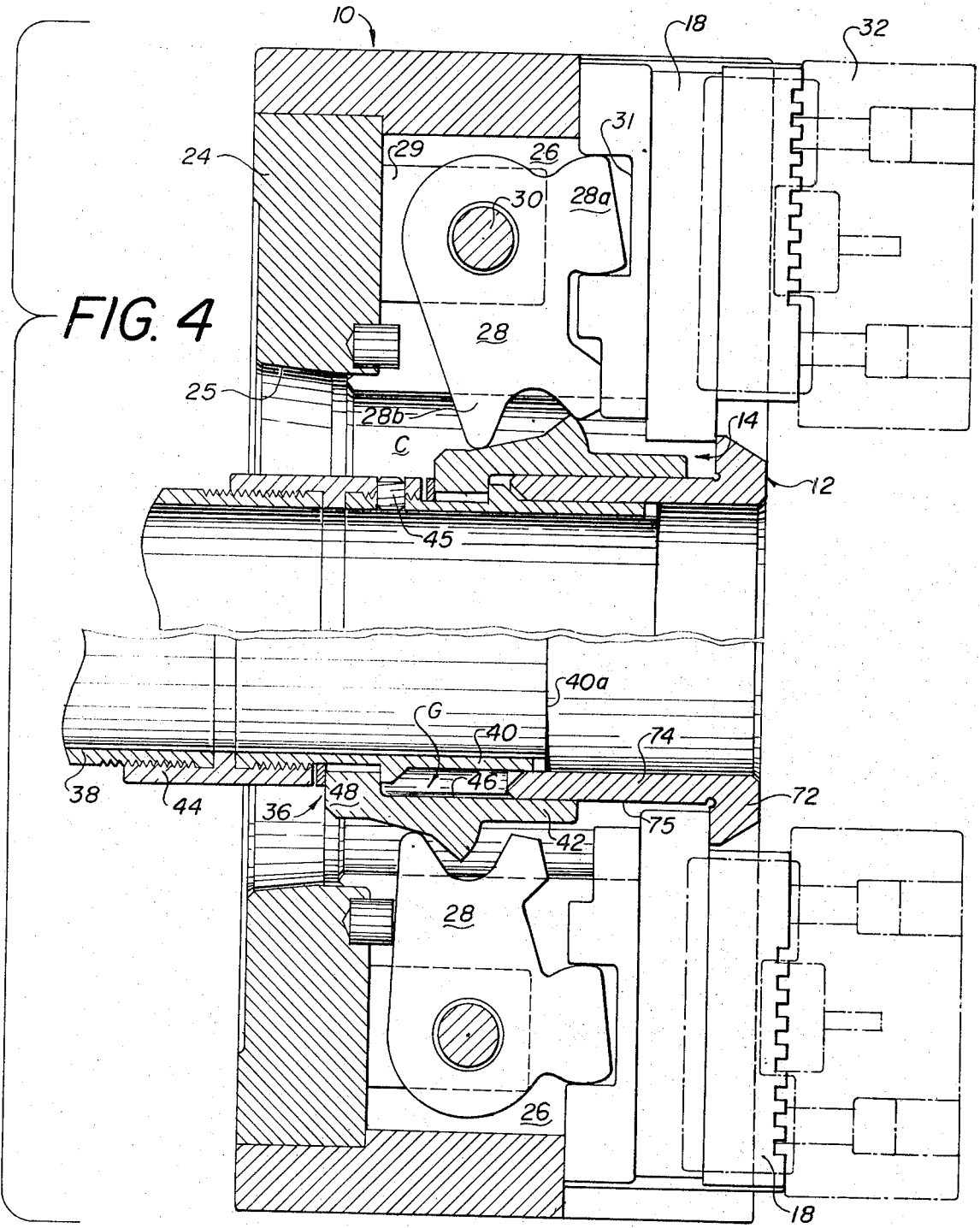

Constructional details of a chuck 10 embodying the present invention are shown in FIGS. 3 and 4, the chuck including the work center 16 in FIG. 3 and the dust bushing guide 12 in FIG. 4. The chuck body 10, in addition to having the central cavity C, which opens through an aperture 25 in a back plate or adapter 24 by which the chuck is secured to a machine tool spindle, also has three radially disposed cavities 26, two of which are shown in FIG. 3, each directly behind a chuck jaw 18. Each of the cavities 26 communicates with the central cavity C and houses a jaw actuating lever 28 that is pivotally supported by a lever pin 30 carried in a pin bearing 29 in the chuck body. The levers 28 are of the bell crank type, having one shorter arm 28a engaging an associated master jaw 18 in a rearwardly opening slot 31, and a longer arm 28b extending radially into the central cavity C of the chuck body. Pivotal movement of the levers 28 about the associated pins 30 moves the master jaws 18 radially of the chuck body axis A. Work gripping jaws 32 are adjustably secured to the master jaws 18 by a jaw nut 33, key 34 and machine screws 35.

The levers 28 are rocked by an axially movable cam spool assembly 36 connected to a draw tube 38. The cam spool assembly 36 includes an axially movable tubular central support or cam operator 40 and an annular, lever-actuating, cam 42 that is carried by and "floats," i.e., is transversely movable, relative to the support 40. The central tubular support 40 is secured to the draw tube 33 by a collar 44 threaded to both the draw tube and support, and secured against rotation relative to the support by a set screw 45.

The cam 42 has a cylindrical internal surface 46 of substantially larger diameter than the external surface of the support or cam operator 40, providing a forwardly opening annular gap G between the two. An inwardly-directed flange 48 at the back end of the cam 42 provides inner and outer radial shoulders 49, 50 and terminates in an annular, axially extending, cylindrical surface 51 of significantly larger diameter than the outside diameter of the tubular support 40. Relative axial movement between the cam 42 and the support 40 is prevented by a radial flange or shoulder 54 and the inner end 44a of the collar 44, and an associated ring 56. The difference in diameter between the cylindrical surface 51 and the adjacent external surface of the support or operator 40, as well as the difference between the inside diameter of the internal surface 46 of the cam and the flange 54 of the support, permits limited relative transverse movement of the cam with respect to the support.

An external cam surface 58 of the cam 42, contacts inner ends of the lever arms 28b to rock the levers when the cam is moved axially by the operator 40. The manner in which the cam 42 cooperates with the levers 28 is shown in two different positions in the upper and lower portions of FIG. 3, which has been divided horizontally for purposes of illustration. In the upper half, the cam is in a forward position, opening the jaws of the chuck. In the lower half of the FIG. 3, the cam is in a rearward position, pivoting the levers to move the jaws toward the center of the chuck in a work gripping position. The transverse floating movement of the cam 42 provides a compensating action in which the cam applies forces to the levers 28 and master jaws 18 of equal magnitude while permitting the levers to move different distances as the cam shifts laterally, so that the work gripping jaws 32 can contact surfaces of a workpiece that are not necessarily equidistant from the central axis of the chuck body.

The work center assembly 16 received within the aperture 14 serves to close the front end of the cavity C of the chuck body and to locate a workpiece at the central axis of the chuck body. The assembly includes a mounting plate 62 secured to the chuck body and a center-retaining and workpiece locating housing 64, a spring-biased center 66 and centering adjustment wedges 68. The wedges 68, adjustable through screws 69, serve to shift the housing 64 and the center 66 laterally of the chuck axis with respect to the mounting plate 62, for adjusting the center 66 into coincidence with the axis of the machine spindle.

In FIG. 4, the chuck 10 is shown with the work center 16 replaced by the dust bushing guide 12. The dust bushing guide is tubular to permit a workpiece to pass into or through the center of the chuck, through the cam spool assembly 36 and draw tube 38. The dust bushing guide 12 has a front flange 72 and a cylindrical body portion 74. With the flange portion 72 secured to the front of the chuck body 10 by the machine screws 23, the cylindrical portion 74 extends inwardly through the aperture 14 and into the cavity C, an axial distance that locates the portion 74 within the gap G between the operator 40 and cam 42. The inner end of the cylindrical portion 74 extends beyond the rearmost position of the front end 40a of the central tubular cam operator 40, as shown in the lower half of FIG. 4, where the operator is in the withdrawn position. The inside diameter of the cylindrical portion 74 of the dust bushing is just slightly greater than the outside diameter of the tubular operator 40, so that the operator 40 and body portion 74 of the dust bushing 12 are in telescoping relationship to provide a continuous seal through the central cavity C to isolate the internal workings of the chuck from foreign material that otherwise might enter through the central cavity.

The outside diameter of the cylindrical portion 74 of the dust bushing is just slightly smaller than the inside diameter of the cam 42, so that the outside surface 75 of the cylindrical portion 74 is closely received with a clearance fit in sliding relationship within the cylindrical internal surface 46 of the cam. By virtue of the establishment of relatively close tolerances between the dust bushing and the cam, the cylindrical portion 74 serves as a guide for the cam, preventing the lateral or floating movement of the cam otherwise permitted relative to the central tubular operator 40. As a result, when the cam 42 is moved axially, it is maintained concentric with the central axis of the chuck body and rocks all lever arms 28 an equal amount in response to a given axial movement. Thus, with the dust bushing 12 in place, the chuck functions as a universal or self-centering chuck, moving the master jaws 18 and work gripping jaws 32 an equal distance toward and away from the central axis of the chuck body when the draw tube 38 is reciprocated.

As best shown by the two extremes of movement depicted in the upper and lower parts of FIG. 4, the axial length of the cylindrical portion 74 of the dust bushing guide 12 permits full axial reciprocation of the cam 42 without interference, yet maintains a guiding relationship with the cam and a sealing relationship with the cam operator 40 throughout the extent of the cam travel. In addition, because the guide portion 74 of the dust bushing is cylindrical, as is the inner surface 46 of the cam and the outer surface of the operator 40, the guiding function of the dust bushing is independent of its angular position relative to the cam.

From the foregoing, it will be apparent that the action of the chuck can be readily changed from centering to compensating by the alternate use of either the dust bushing guide or the work center, either of which can be conveniently removed by removing the machine screws 23 that secure it to the face of the chuck. With the dust bushing 12 in place the construction of the jaw operating mechanism as well as the bushing facilitates the passage of work through the chuck body. The construction also facilitates the replacement of the dust bushing with a pull-type collet, which can be connected to the draw tube, for additional versatility. One particular advantage of the present construction is that, while the chuck is adapted for compensating or centering action, the mechanism for guiding the cam and restricting floating action, need not be carried within the chuck when the centering action is not being used. Moreover, by accomplishing the converstion through the use of a removable dust bushing, a simplified construction can be utilized which results in a minimum change to standard chuck components and which facilitates the passage of work through the chuck when a work-locating center is not required.

While a preferred embodiment of the invention has been described in detail, it will be understood that various modifications or alterations may be made therein without deparing from the spirit and scope of the invention set forth in the appended claims.

What is claimed is:

1. A chuck adaptable for compensating and centering actions for use with bar work, chucking work and shaft work, comprising: a chuck body; a plurality of work gripping jaws carried in a front face of said body for movement toward and away from each other; and jaw actuating means in the body for moving the jaws toward and away from each other, including an annular jaw actuator movable axially toward and away from the front face to actuate the jaws, a tubular reciprocable operator surrounded by said jaw actuator, means connecting said jaw actuator to said tubular operator for axial movement therewith and for limited floating movement relative thereto transversely of the direction of said axial movement, and a cylindrical gap between the tubular operator and the actuator, opening toward the front face of the chuck body, to closely and removably receive a guide member that prevents said floating movement without regard to the circumferential location of the guide member within the gap.

2. A chuck adaptable for compensating and centering actions for use with bar work, chucking work and shaft work, comprising: a chuck body; a plurality of work gripping jaws carried in a front face of said body for movement toward and away from each other; jaw actuating means in the body for moving the jaws toward and away from each other, including an annular jaw actuator movable axially toward and away from the front face to actuate the jaws, a tubular reciprocable operator surrounded by said jaw actuator, means connecting said jaw actuator to said tubular operator for axial movement therewith and for limited floating movement relative thereto transversely of the direction of said axial movement, a cylindrical gap between the tubular operator and the actuator, opening toward the front face of the chuck body; and a removable dust bushing having a cylindrical portion extending into the chuck body, closely received within said cylindrical gap and through which a workpiece can extend, said cylindrical portion extending inwardly of the chuck body beyond the extent of axial travel of the actuator and constructed to permit relative axial movement of the actuator while preventing relative transverse movement of the actuator without regard to the circumferential location of the guide member within said gap.

3. A rotary chuck adaptable for compensating and centering actions and for use with bar work as well as chucking work and shaft work, comprising: a chuck body having front and rear faces and a central axis about which the chuck is adapted to be rotated; a central cavity through the chuck body; a back plate secured to the chuck body and at least in part forming the rear face, said back plate having a central opening communicating with said central cavity; a plurality of work-gripping-jaw carriers adjacent said front face, movable toward and away from said central axis; a lever connected with each jaw carrier; means pivotally securing said levers in said chuck body; an annular lever-operating cam in said central cavity movable along said central axis, said cam having an internal guide surface and an external lever-operating cam surface operatively engageable with said levers; a tubular support and operator for said cam located concentrically within said cam and having means for securing the support to a reciprocable draw tube; means interconnecting said cam and tubular support for conjoint axial movement and for limited relative movement transversely of said axis; an annular gap between said tubular support and said cam opening toward said front face for removably receiving a guide in slidable contact with said internal guide surface of the cam and with an external surface of said cam support; and a removable bushing secured in fixed relationship to said front face, with a guide portion received within said annular gap, said bushing having a central opening; the opening in said back plate and bushing and the tubular construction of said cam support facilitating the through-passage of work to be gripped by said chuck.

4. A chuck comprising a body having a central axis of rotation, a through passage along said axis, and a plurality of jaws movable toward and away from said axis, a tubular jaw operator within said passage and movable along said axis, an annular jaw actuator surrounding said operator and operatively interconnected with said jaws to move the jaws through axial movement of the actuator, means interconnecting the actuator and operator for conjoint axial movement and independent movement transversely of said axis, said actuator and operator having a circumferential gap therebetween to permit said independent transverse movement, and a tubular guide extending axially within said passage, removably secured to said body in a fixed location concentric with said axis, and received within said gap with a close clearance fit to permit sliding relationship between said guide and said operator and actuator while preventing independent transverse movement between the actuator and operator.

5. A chuck as set forth in claim 4 wherein said guide extends axially in overlapping relationship with said operator throughout the extend of axial travel of the operator.

6. A chuck as set forth in claim 5 wherein said tubular operator and guide are unobstructed at opposite ends thereof and provide a through passageway for work.

7. A chuck adaptable for compensating and centering actions, comprising: a chuck body; a plurality of jaws carried by said body for movement toward and away from each other; and jaw actuating means in the body for moving the jaws toward and away from each other, including an annular jaw actuator reciprocable axially within the chuck body to actuate the jaws, a reciprocable operator surrounded by said jaw actuator, means connecting said jaw actuator to said operator for axial movement therewith and for limited floating movement relative thereto transversely of the direction of said axial movement, a circumferential gap between the operator and the actuator, opening toward the front face of the chuck body, and a removable dust bushing having a mounting flange externally secured to the chuck body with a tubular portion extending inwardly thereof into said gap, preventing said floating movement of the jaw actuator.

8. A chuck adaptable for compensating and centering actions, comprising: a chuck body; a plurality of jaws carried by said body for movement toward and away from each other; jaw actuating means in the body for moving the jaws toward and away from each other, including in actuator reciprocable within the chuck body to move the jaws, an operator received within the chuck body reciprocable to move the actuator, means connecting the jaw actuator to the operator for conjoint reciprocable movement and limited relative transverse floating movement; an opening in the actuator facing toward the front face of the chuck body to closely and removably receive a separate and removable guide member; and a removable guide member received in said opening with surfaces that guide said jaw operator in reciprocable movement and that prevents said transverse floating movement.

9. A chuck adaptable for compensating and centering actions, comprising: a chuck body rotatable about a central axis; a plurality of jaws carried by said body for movement radially of the body toward and away from each other; jaw actuating means in the body for moving the jaws toward and away from each other, including an actuator reciprocable axially within the chuck body to move the jaws, an operator received within the chuck body reciprocable axially of the body to move the actuator, means connecting the jaw actuator to the operator for conjoint reciprocable movement and relative transverse movement; and an axial passageway in the actuator opening toward the front face of the chuck body to closely and removably receive a separate and removable guide member; and a removable guide member received in said passageway with surfaces that guide said operator in reciprocable movement and that prevents said transverse movement.

10. A chuck adaptable for compensating and centering actions, comprising: a chuck body rotatable about a central axis; a plurality of jaws carried by said body for movement radially of the body toward and away from each other; a jaw actuating means in the body for moving the jaws toward and away from each other, including an actuator reciprocable axially within the chuck body to move the jaws, an operator received within the chuck body reciprocable axially of the body to move the actuator, means connecting the jaw actuator to the operator for conjoint reciprocable movement and relative transverse movement; an axial passageway in the actuator opening toward the front face of the chuck body to closely and removably receive a separate and removable guide member that permits said reciprocable movement and prevents said transverse movement when located within the opening; and a guide member removably received in and stationary with respect to said chuck body, having an axially extending surface slidably received in said passageway to guide axial movement of said actuator.

11. A chuck as set forth in claim 10 including pivoted levers carried within the chuck body, each connected with a jaw and wherein reciprocation of said jaw actuator pivots said levers equally when the actuator is guided by said guide member and unequally when the guide member is removed.

12. A chuck adaptable for compensating and centering actions, comprising: a chuck body rotatable about a central axis; a plurality of jaws carried by said body for movement radially of the body toward and away from each other; jaw actuating means in the body for moving the jaws toward and away from each other, including an actuator reciprocable axially within the chuck body to move the jaws, an operator received within the chuck body reciprocable axially of the body to move the actuator, means connecting the jaw actuator to the operator for conjoint reciprocable movement and relative transverse movement; an axial passageway in the actuator opening toward the front face of the chuck body and forming a surface guidable along an axial path by a removable guide member that permits said reciprocable movement and prevents said transverse movement when located within the opening; and a work locating center removably received in said chuck body in non-guiding relationship with said surface to permit said transverse movement.

* * * * *

UNITED STATES PATENT OFFICE
CERTIFICATE OF CORRECTION

Patent No. 3,858,893　　　　　　　Dated January 7, 1975

Inventor(s) George J. Ovanin

It is certified that error appears in the above-identified patent and that said Letters Patent are hereby corrected as shown below:

Column 4, line 16, "33" should be -- 38 --.

In the Claims:

Claim 5 (column 7, line 52) "extend" should be -- extent --;
Claim 8 (column 8, line 24) "operator" should be -- actuator --.

Signed and Sealed this fifth Day of August 1975

[SEAL]

Attest:

RUTH C. MASON
Attesting Officer

C. MARSHALL DANN
Commissioner of Patents and Trademarks